United States Patent
Williams et al.

(10) Patent No.: US 7,565,800 B2
(45) Date of Patent: Jul. 28, 2009

(54) EXHAUST COMPONENTS INCLUDING HIGH TEMPERATURE DIVIDER PLATE ASSEMBLIES

(75) Inventors: Rick Williams, Kitchener (CA); Richard T. Snowdon, Brantford (CA); Clayton A. Sloss, Paris (CA)

(73) Assignee: Wescast Industries, Inc., Brantford, ON (CA)

( * ) Notice: Subject to any disclaimer, the term of this patent is extended or adjusted under 35 U.S.C. 154(b) by 0 days.

(21) Appl. No.: 11/151,681

(22) Filed: Jun. 13, 2005

(65) Prior Publication Data
US 2006/0277902 A1    Dec. 14, 2006

(51) Int. Cl.
*F01N 7/10*    (2006.01)
(52) U.S. Cl. ........................... 60/323; 60/324
(58) Field of Classification Search ............ 60/323, 60/324, 280, 322; 180/240
See application file for complete search history.

(56) References Cited

U.S. PATENT DOCUMENTS

| | | | | |
|---|---|---|---|---|
| 3,768,260 A | * | 10/1973 | Glenn | 60/323 |
| 4,776,167 A | * | 10/1988 | Kawamura | 60/602 |
| 4,787,945 A | * | 11/1988 | Smith et al. | 148/428 |
| 4,796,426 A | * | 1/1989 | Feuling | 60/313 |
| 4,815,274 A | * | 3/1989 | Piatti | 60/313 |
| 5,079,921 A | * | 1/1992 | McCandless et al. | 60/602 |
| 5,148,675 A | * | 9/1992 | Inman | 60/321 |
| 5,406,795 A | * | 4/1995 | Raub et al. | 60/605.1 |
| 6,256,990 B1 | * | 7/2001 | Itoh | 60/597 |
| 6,349,542 B1 | * | 2/2002 | Moore, III | 60/323 |
| 6,918,246 B2 | * | 7/2005 | Fukumoto et al. | 60/323 |
| 2002/0040579 A1 | | 4/2002 | Furudate | |

FOREIGN PATENT DOCUMENTS

| | | |
|---|---|---|
| DE | 18857979 | 7/2001 |
| EP | 0955453 | 11/1999 |
| FR | 2870289 | 11/2005 |
| FR | 2875266 | 3/2006 |

* cited by examiner

*Primary Examiner*—Tu M Nguyen
(74) *Attorney, Agent, or Firm*—Harness, Dickey & Pierce, PLC (57) ABSTRACT

A combustion engine exhaust assembly. The assembly comprises an exhaust gas passageway that includes a divider plate assembly. The divider plate assembly includes a body and a divider plate wherein at least one of the body and the divider plate are generally formed from a material resistant to at least one of extreme temperature conditions, extreme thermal gradient conditions, and extreme loads. The divider plate assembly is useful in distributing exhaust gases within an exhaust assembly and is generally capable of extending the useful life of an exhaust manifold, for example.

19 Claims, 10 Drawing Sheets

EXHAUST COMPONENTS INCLUDING HIGH TEMPERATURE DIVIDER PLATE ASSEMBLIES

FIELD OF THE INVENTION

The present invention relates to exhaust components employing high temperature divider plate assemblies. While the following examples and discussion generally relate to exhaust manifold applications, it should be understood by those skilled in the art that the general concepts discussed herein are also applicable to other "exhaust components" such as turbochargers, by way of non-limiting example. Additionally, while each of the embodiments depicted pertain to cast manifold applications, it should also be recognized that the high temperature divider plate assemblies may be useful in fabricated exhaust systems.

BACKGROUND OF THE INVENTION

According to the present invention, exhaust components such as exhaust manifolds, include multiple components formed from a combination of different materials. The use of different materials allows a low cost material (typically with lower temperature capability) to be used in regions of the component that are generally subjected to lower temperatures and less severe loading, and a higher grade, more temperature resistant material, in regions of high temperature, high thermal gradients, or high stress.

One typical example would involve a cast iron exhaust manifold. It is common to employ alloyed (e.g. with silicon and molybdenum) cast iron exhaust manifolds on high volume production engines because they often have advantages in terms of cost, durability, packaging, and NVH (noise, vibration, and harshness). Packaging refers to the task of arranging flow paths from each port to a common outlet position (with minimum flow losses) while maintaining clearance to other underhood components and providing access for all fasteners during assembly. However, as automotive companies increase the gas temperatures of their engines to improve efficiency and reduce exhaust emissions, manifold applications are exceeding the practical working (temperature) limit of the cast iron employed. One factor contributing to the working temperature range of a ferritic material is the AC1 temperature. The AC1 temperature marks the beginning of a transformation from the body-centered-cubic molecular structure associated with ferrite to the face-centered-cubic structure of an austenitic material. Many things occur with the transformation from ferrite to austenite, including a marked change in solubility of certain alloying elements. At temperatures above the AC1, the cast iron is more prone to damage from oxidation, decarburization, and coarsening. This means that in applications where the metal temperatures are above the AC1, there is much greater propensity to incur material damage. Higher temperature and longer duration at elevated temperature will result in greater material damage accumulation.

Upon closer inspection of exhaust manifolds after extended use at high temperature, it becomes evident that heat transfer is non-uniform and that certain areas of the manifold are much hotter than other areas. SiMo (silicon-molybdenum) cast iron exhaust manifolds have an AC1 temperature of approximately 830-840° C. Since a typical maximum manifold outlet gas temperature for a current North American gasoline engine is about 900° C., it can be shown that most areas of the manifold will be below the AC1 temperature. Currently, if a material such as SiMo cast iron, for example, is inadequate for the peak temperature areas, the entire manifold has to be made in a higher grade material (Ni-Resist, cast steel, or fabricated from stainless steel). In view of the foregoing, the inventors of the present invention suggest that exhaust components, including a divider plate assembly, can be made of a combination of materials, using the high temperature material where required and the lower temperature material elsewhere.

The discussion above focuses mainly on absolute temperature and the general resistance to damage of a material subjected to those temperatures. An additional application for composite exhaust components exists when the mechanical loads and/or thermally induced strains are too great for certain materials. Even if the temperature is below the AC1 temperature, regions that are subjected to high thermal strains and/or mechanical loads can fail prematurely due to cyclic thermal mechanical fatigue. Areas that are prone to extreme thermal gradients are common such as shared walls between exhaust runners or bifurcations that separate plenums/chambers/runners in the manifold. These areas have high heating and cooling thermal gradients because they are simultaneously heated (or cooled, depending on the mode of operation of the test cycle) from both sides.

Referring particularly to exhaust components such as manifolds, the highest (steady state) material temperatures are generally in the region of the manifold outlet, i.e. the area in which the manifold runners leading from the engine block are joined. If the exhaust flow is separated by a bifurcation or shared wall, the thermal gradients (which cause local strains) are greatest in this region because of the (transient) heating and cooling from both sides. Replacing the low temperature material in the critical regions (bifurcation, shared wall, outlet region) with a material more appropriate for the local loading and temperature requirements would result in a more cost effective solution than upgrading the material of the entire manifold. More particularly, the present invention provides divider plate assemblies for location in high temperature areas such as exhaust manifold outlets, wherein at least one of the components of the divider plate assembly is formed from a high temperature capable material. Such "high temperature" materials refer to materials with the desired material properties at elevated temperatures such as strength, microstructural stability, and/or oxidation resistance, by way of non-limiting examples.

Single material cast exhaust components can suffer severe damage in regions of local high temperature and large thermal gradients such as the outlet or a bifurcation. The high temperature promotes oxidation and the thermal gradients introduce local strains that may make the oxide layer less adherent. If spalling of the oxide occurs, particles are released into the exhaust gas stream that may bombard and damage downstream components such as turbochargers and catalytic converters. Exhaust components incorporating divider plate assemblies, such as those described herein, reduce or eliminate this mechanism and in turn maintain system performance, rather than causing it to degrade with time.

The oxidation, particle coarsening, and decarburization that occurs locally in the high temperature regions can significantly degrade the local material properties over time. Obviously this can result in premature cracking and warpage, both of which can reduce component durability performance. These effects, in turn, can result in exhaust gases leaking to the environment (through a crack or loss of sealing) or allow exhaust gas to communicate (travel) between separated runners or chambers (either will negatively influence system performance). If large thermally induced strains are co-located with the manifold areas with degraded material properties, component failure by cracking is common.

In addition, use of a divider plate assembly may result in reduced loading caused by the divider/bifurcation on the surrounding manifold material. One example of this is when the divider plate is made of a high temperature capable material, and the plate is designed to flex or elastically deform during rapid heating. This helps to reduce the loads that are transferred from the plate to the surrounding structures. Another method of reducing the loads occurs when there is sliding contact between the insert plate and the main manifold body. This arrangement occurs with the slide-in insert, and possibly with the cast-in insert plate, when the plate is made from a ceramic or covered in a thin refractory coating or other suitable material prior to casting the manifold. With a small gap between the insert plate and the body, differential expansion/contraction is possible without transferring large loads between the two members.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DESCRIPTION OF VARIOUS EMBODIMENTS

Figure 1:
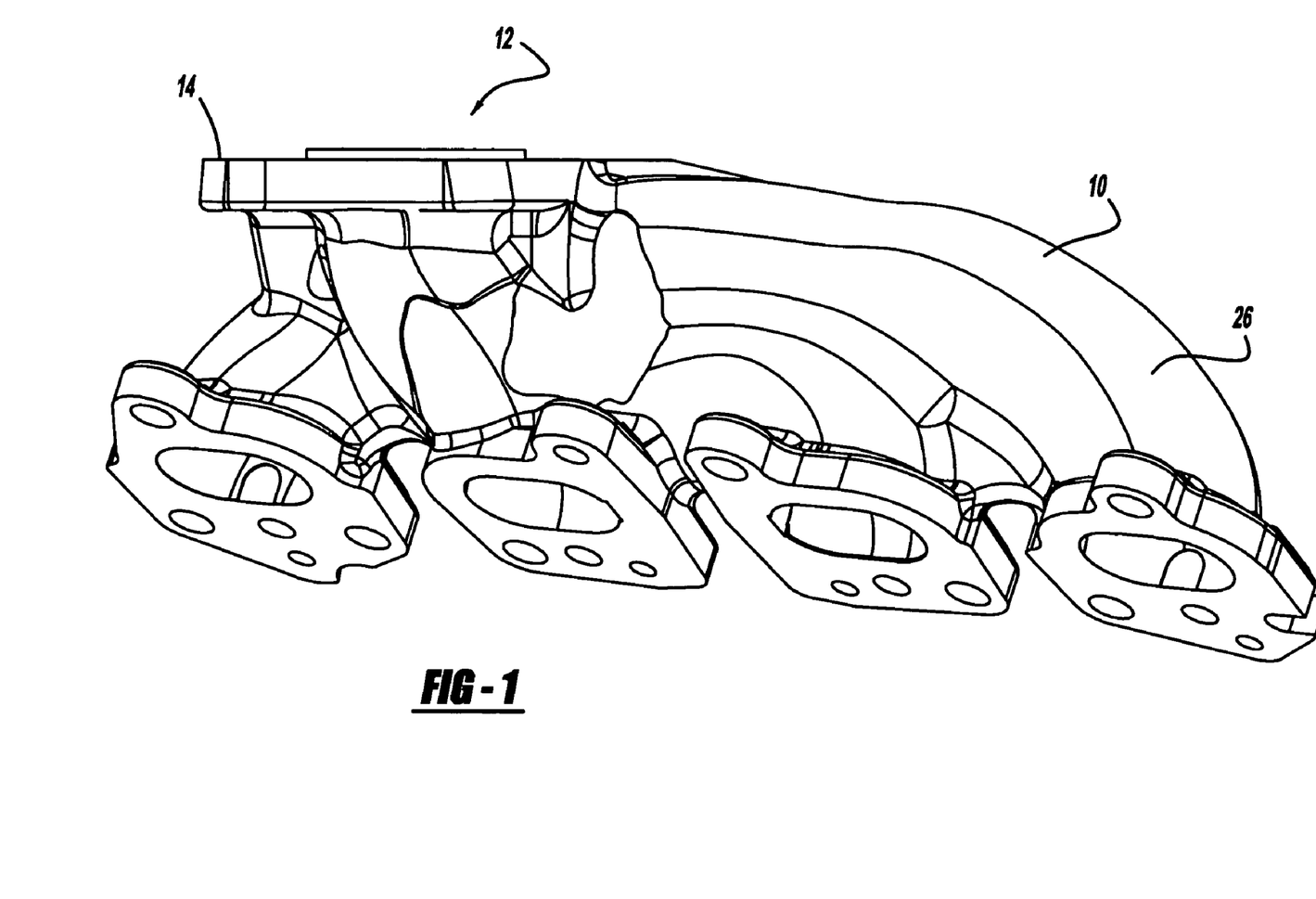
FIG. 1 is a perspective view of an exhaust manifold employing a first divider plate assembly in accordance with the teachings of the present invention.
Figures 2, 2A:
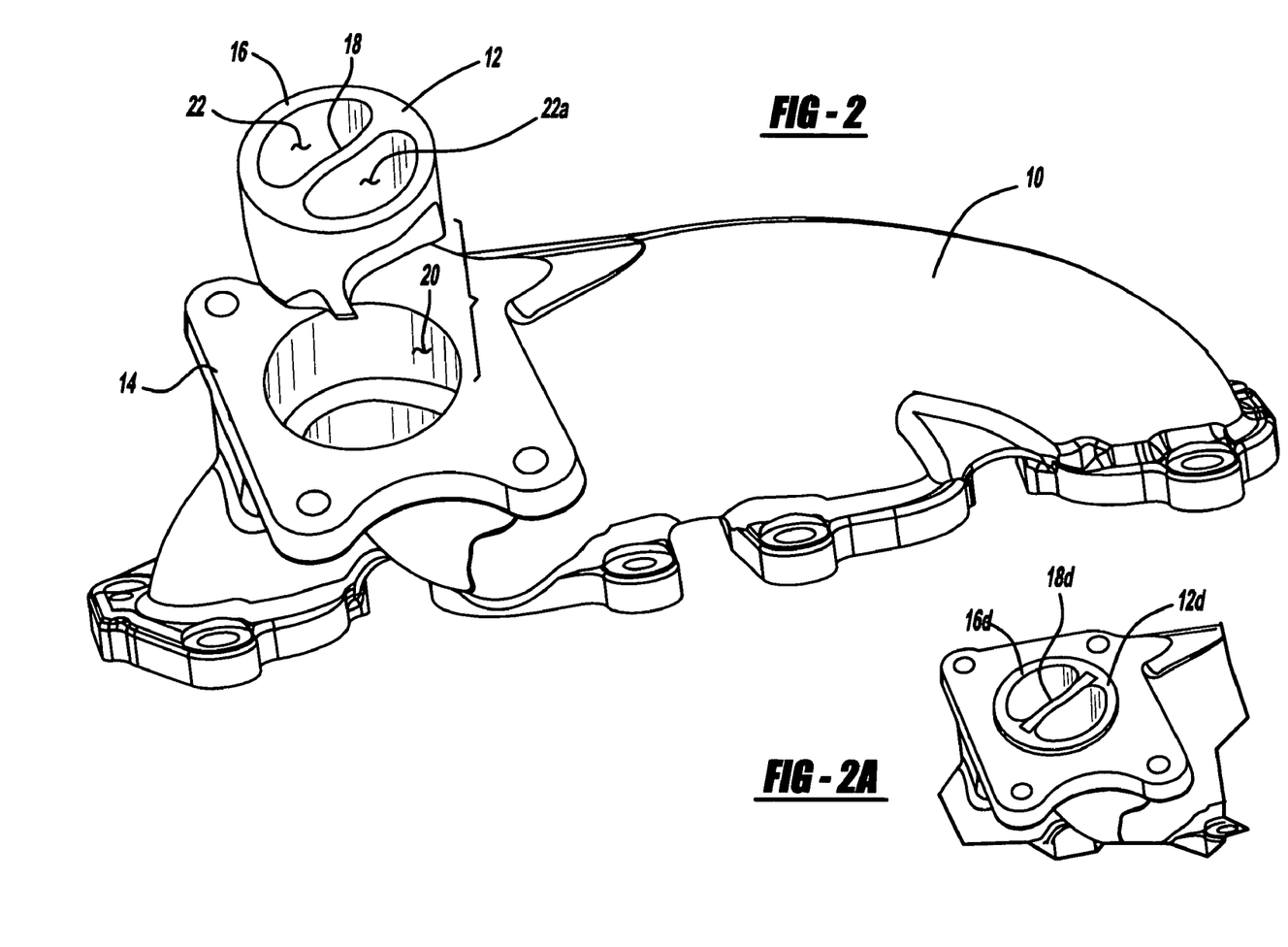
FIG. 2 is a blown apart perspective view of the divider plate assembly of FIG. 1.
Figure 3:
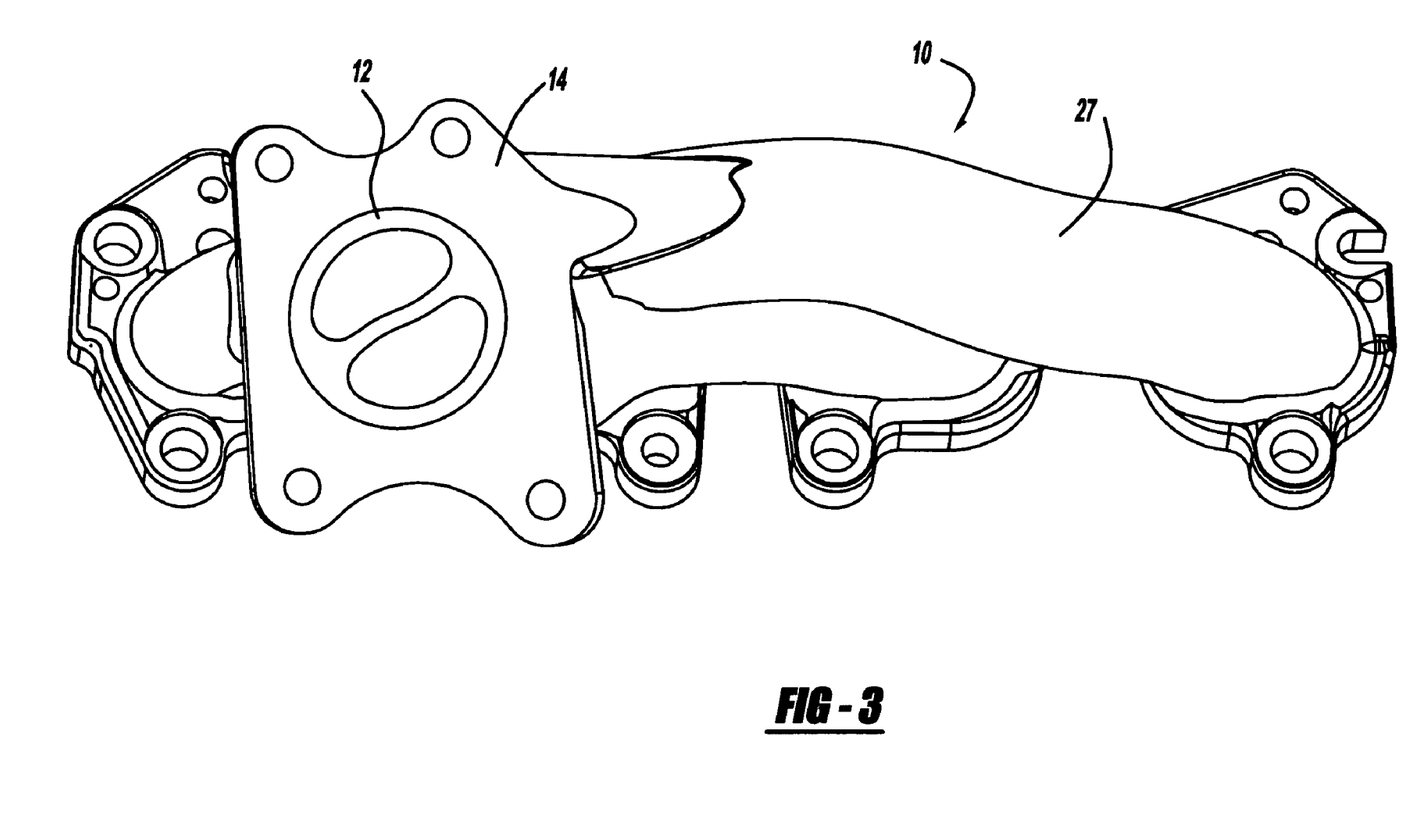
FIG. 3 is an assembled perspective view of the divider plate of FIG. 1.

FIGS. 1-3 show an exhaust manifold 10 employing a divider plate assembly 12 incorporated into an exhaust gas component passageway, such as an outlet portion 14, of the exhaust manifold. By "exhaust gas component passageway" it is intended to mean essentially any portion of the exhaust system through which exhaust gas passes prior to discharge. The passageway may have a single channel or port or may include multiple ports. In the design of FIGS. 1-3, the divider plate 18 is integrally cast as part of the divider plate assembly body 16 which, when cast, takes on the shape of the opening 20 of the outlet 14. The divider plate and/or the main body are preferably formed from a high temperature material such as stainless steel by way of non-limiting example. In contrast, the remainder of the exhaust manifold may be formed from cast iron. Preferably, the divider plate 18 extends across the body 16 of the assembly to effectively provide the divider plate assembly with at least two separate chambers 22, 22a, respectively, into which exhaust gas is directed. The divider plate assembly can also be incorporated into an exhaust gas passageway of a turbocharger, such as in an inlet of a turbocharger.

Under the embodiment of FIG. 2A, the divider plate assembly 12d is similar to that of FIGS. 1-3 except that the divider plate 18d is insertable into the body 16d. The body 16d may be cast as part of the manifold 10 or can be separately cast. The divider plate 18d may be formed from a material such as stainless steel or a ceramic material when it is desirable to employ a high temperature material. It should be understood, however, that the material of the divider plate can actually be made from materials which are relatively cheap and intended to be readily replaced and thus may not be higher temperature materials as defined herein.

Figure 4:
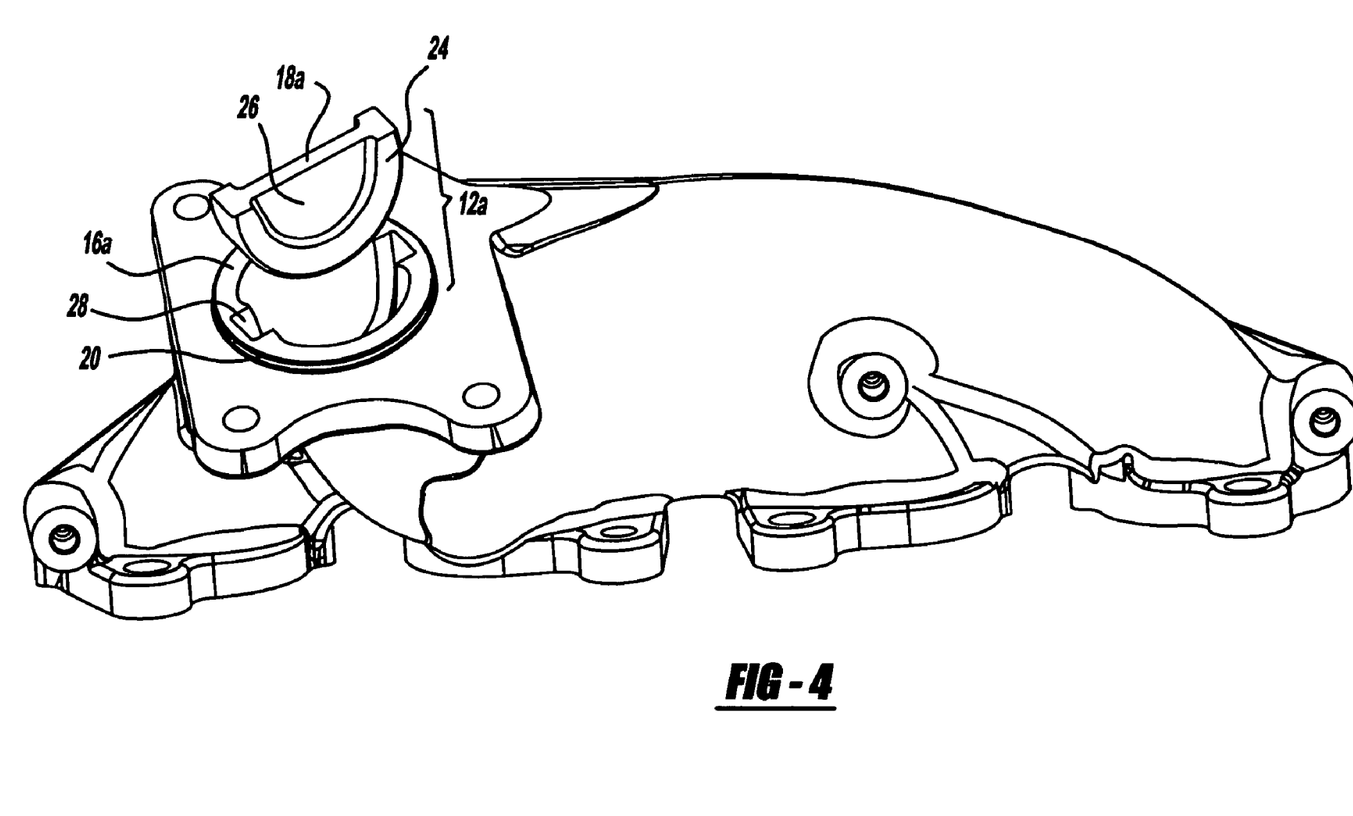
FIG. 4 is a partially blown apart perspective view of an exhaust manifold employing a second divider plate assembly in accordance with the present invention.
Figure 5:
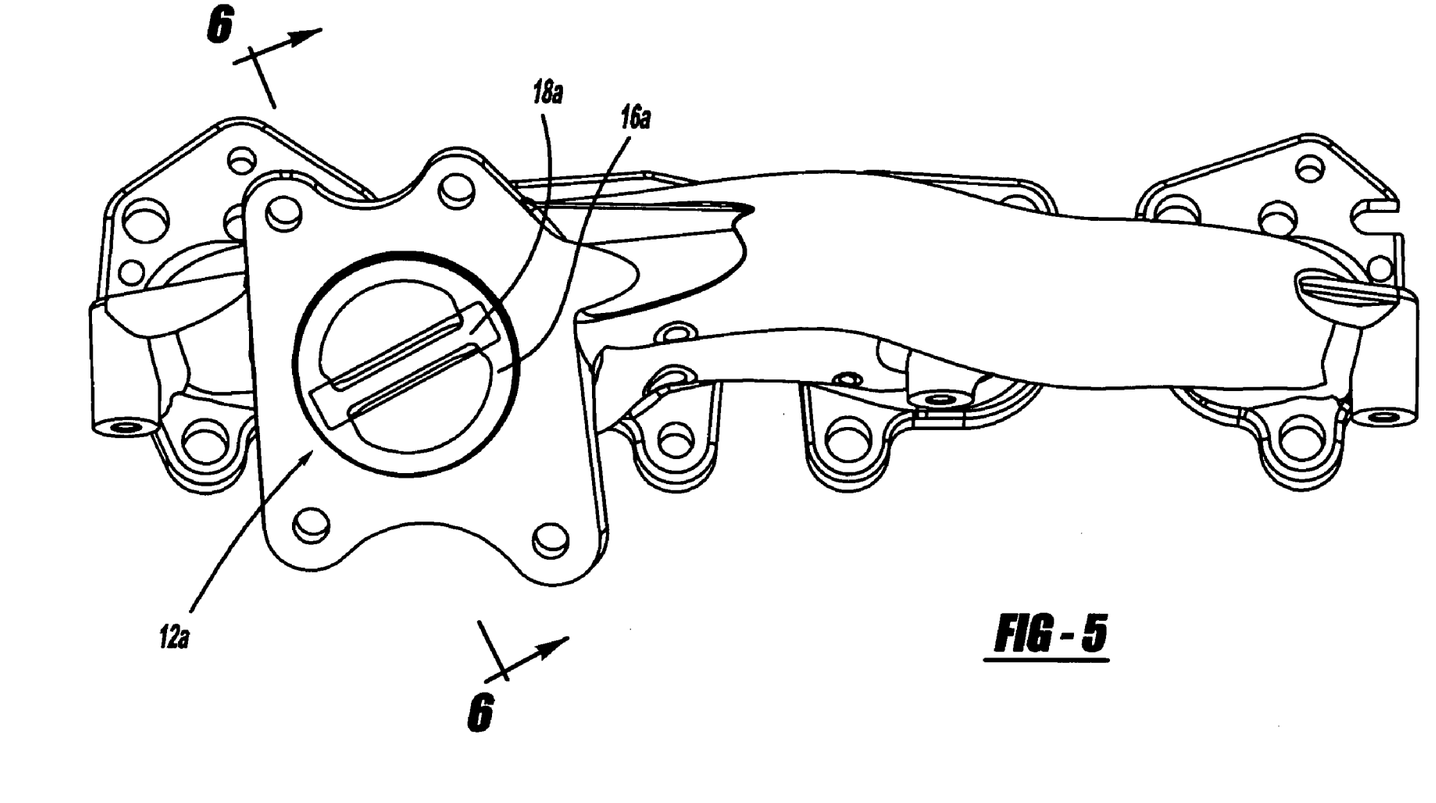
FIG. 5 is an assembled perspective view of the divider plate assembly of FIG. 4.
Figure 6:
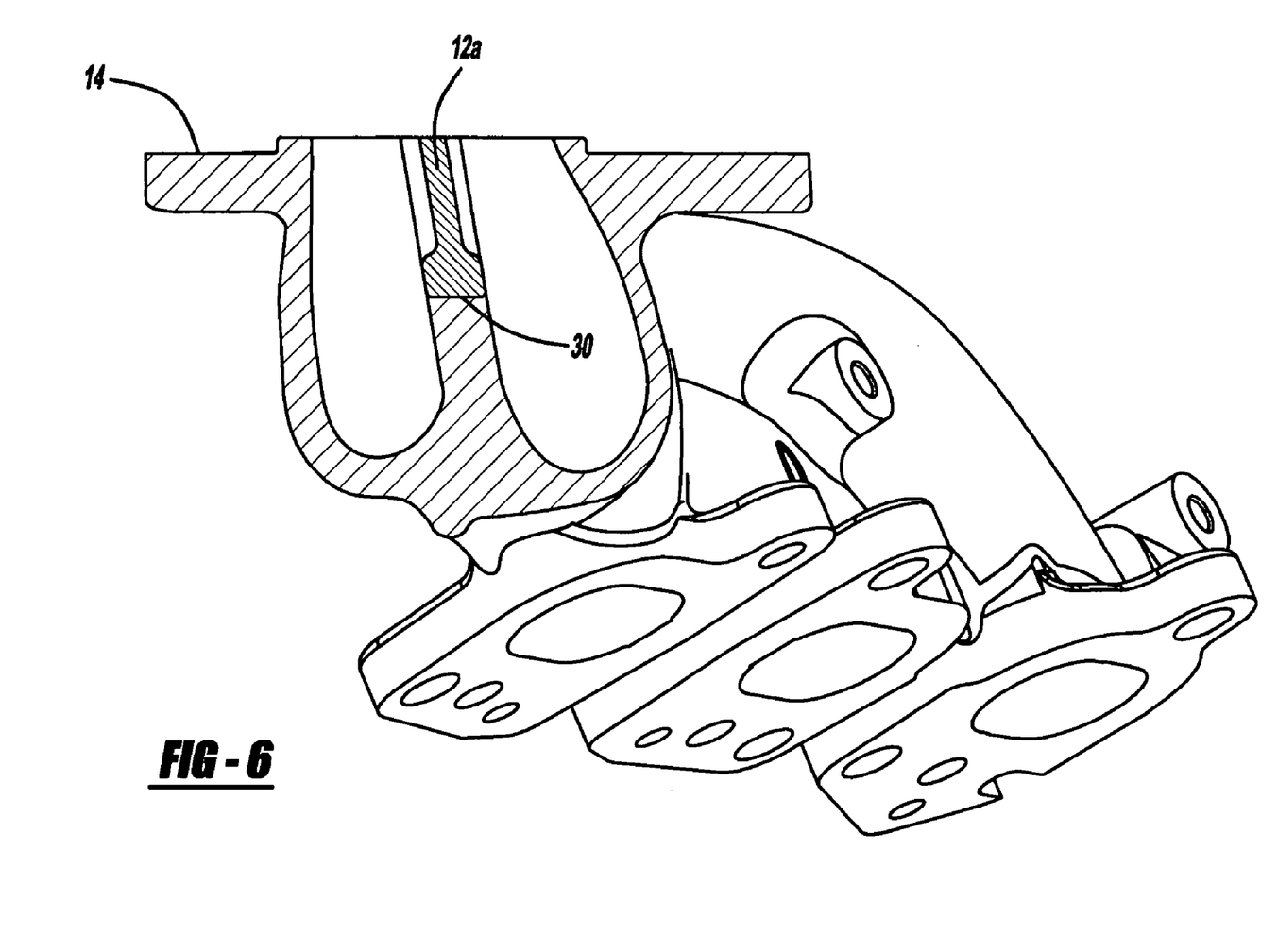
FIG. 6 is a sectional view of the divider plate assembly of FIG. 4 taken along line 6-6 of FIG. 5.

Referring to FIGS. 4-6, an alternative divider plate assembly 12a is illustrated wherein the body 16a and the divider plate 18a are formed separately. The body 16a and/or the divider plate 18a are preferably formed from a high temperature and/or high thermal gradient material such as stainless steel. The divider plate 18a can be disposed within the gas passageway outlet opening 20, or in an exhaust manifold gas passageway, with the body 16a cast about the divider plate 18a. In this manner, the body 16a not only takes on the shape of the opening 20 but also conforms to the shape of the divider plate 18a. Herein, the divider plate 18a includes a reinforced peripheral edge 24 such that the edge has a greater thickness than the centrally disposed portion 26 of the plate 18a. Thus, the divider plate assembly body 16a, as shown most clearly in FIG. 4, includes a slot 28 to accommodate the thicker edge of the plate 18a. Again, the divider plate serves to separate the assembly into at least two exhaust gas chambers.

Unlike the embodiment of FIGS. 1-3, this embodiment allows for the divider plate 18a to be a machined or separately cast component. The bond between the divider plate and the body 16a may be essentially mechanical in nature or, depending on the alloys employed, the cast material of the body may melt some surface material of the divider plate which can result in a physical/metallurgical/chemical bond. The bond between the divider plate and the body, and between the body and the manifold outlet, can serve multiple purposes. For example, it ensures a leak-free seal between the runners 27 or flow chambers of the manifold; it holds the divider plate in place to prevent rattling or vibration/movement issues such as NVH problems; and it prevents the insert from falling out during shipping and assembly. Optionally, the divider plate could be provided with a thin refractory coating to prevent strong adhesion between the cast material body and the divider plate which may allow for periodic replacement of the divider plate. In these cases the insert would have some feature such as a tab, dovetail, or tapering geometry that would "lock" it into the cast groove and prevent it from falling out as will be shown in other multi-piece divider plate assemblies which will be described in greater detail below.

Preferably, the divider plate is designed to be disposed as far down within the outlet as possible to limit the amount of "low temperature/low cost cast material" in this region due to the severe operating environment of the bifurcation. As demonstrated, the cast material in the bifurcation region 30 of the manifold typically must be much thicker than the divider plate 18a (made of higher grade material) to withstand the thermal gradients and material degradation that it will see in that region.

Figure 7:
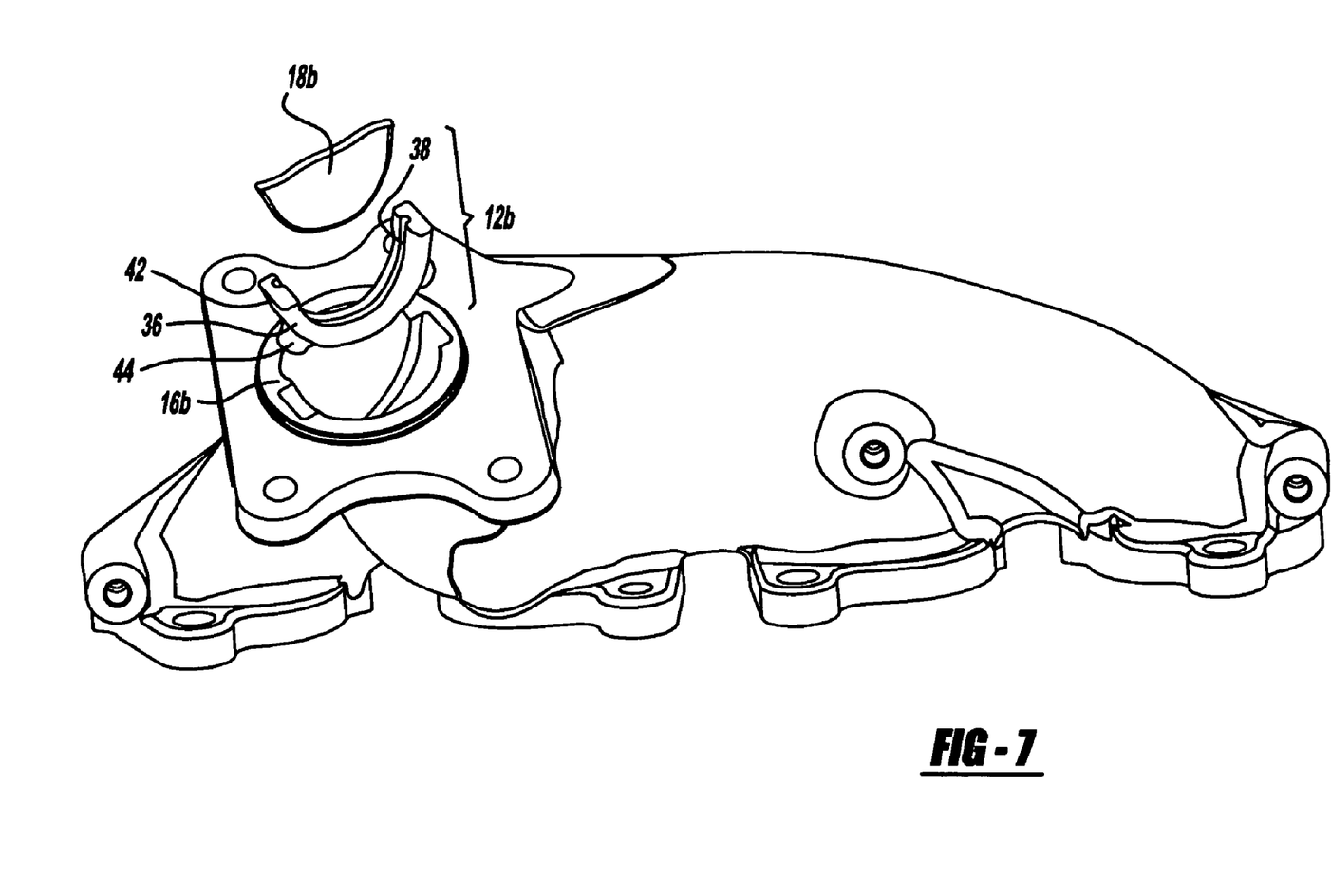
FIG. 7 is a partially blown apart perspective view of an exhaust manifold employing a third divider plate assembly in accordance with the teachings of the present invention.
Figure 8:
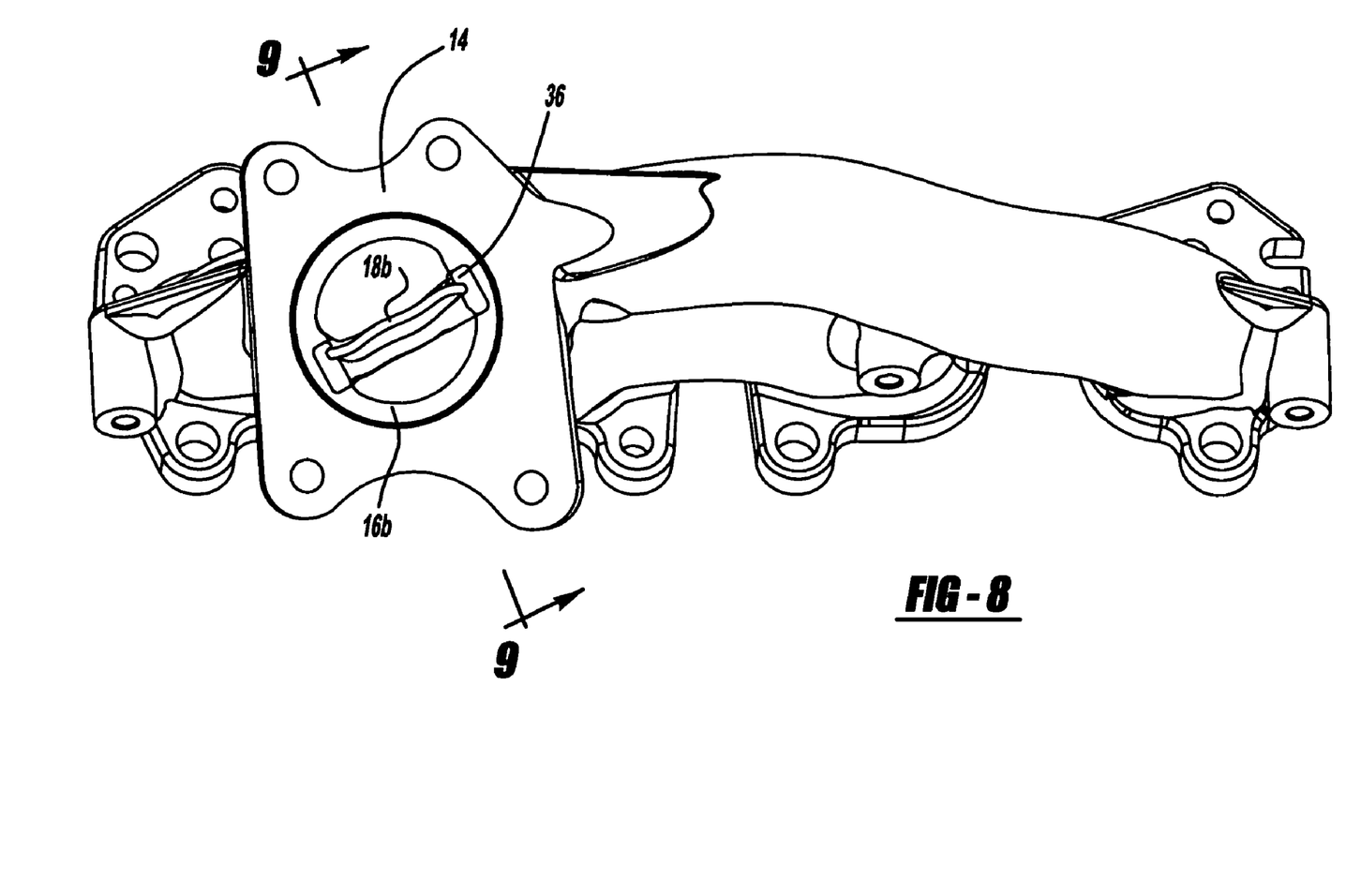
FIG. 8 is an assembled perspective view of the divider plate assembly of FIG. 7.
Figure 9:
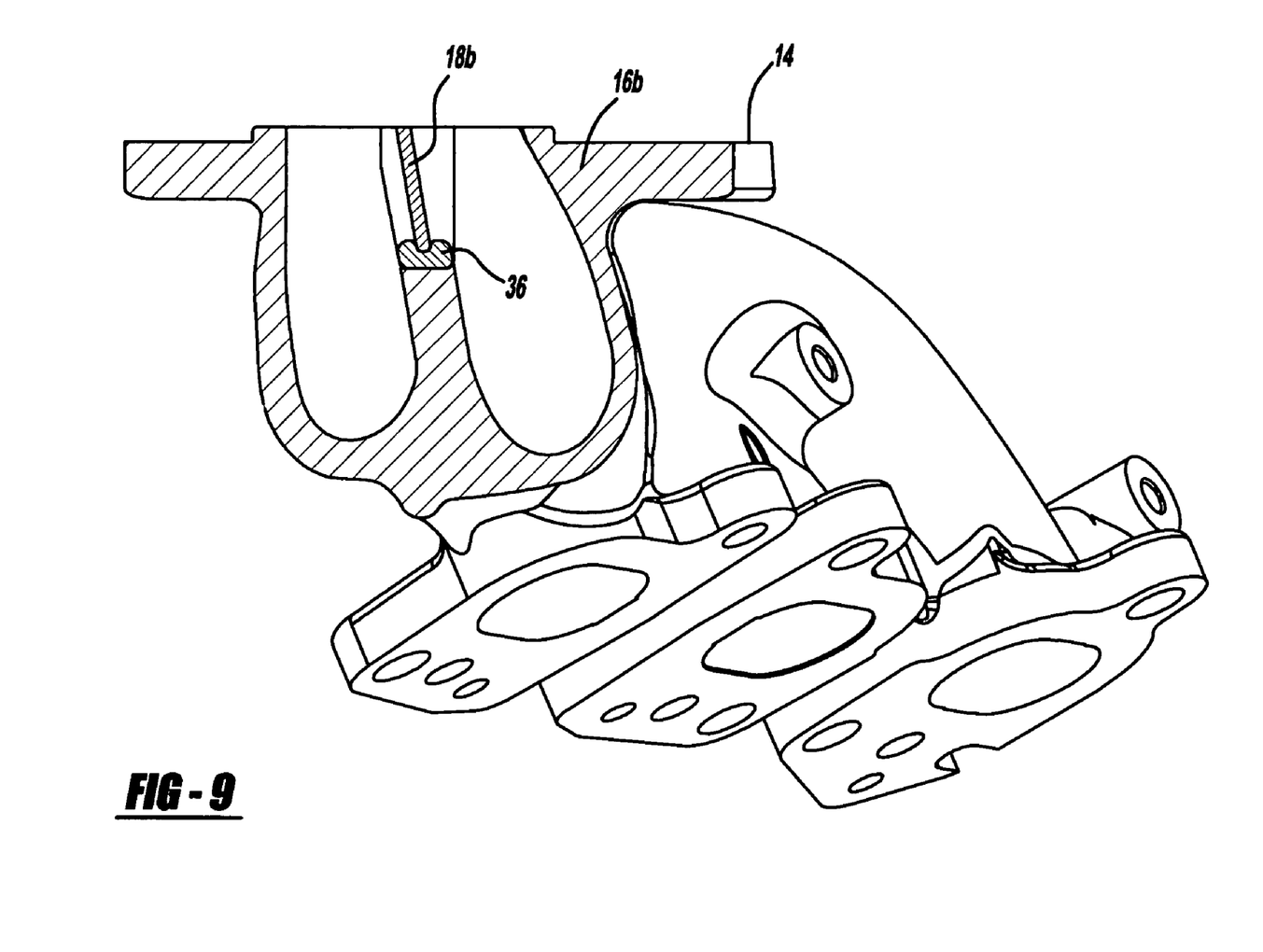
FIG. 9 is a sectional view of the divider plate assembly of FIG. 7 taken along line 9-9 of FIG. 8.

Another embodiment of the present invention is depicted in FIGS. 7-9. As with the other embodiments, the divider plate assembly 12b of this embodiment can be present in, for example, a gas passageway of a manifold assembly or a turbocharger. Under this embodiment, the divider plate assembly 12b includes a substantially u-shaped part 36 having a channel 38 for receiving the high temperature divider plate 18b. For practical reasons, the u-shaped part 36 would likely be assembled into a core prior to being set into a mould. Thereafter, the divider plate 18b would be inserted into the channel in the u-shaped part 36 and the body 16b of the divider plate assembly 12b cast about the u-shaped part and insert. Disposed along the outer portion 42 of the u-shaped part may be one or more locking tabs 44 which provide anchoring points when casting the body 16b. Because the u-shaped part is intermediate to the body 16b of divider plate 18b it effectively can serve as a buffer. The divider plate 18b may be substantially flat or may be wavy which, under certain applications such as thinner divider plates (less than about 2.0 mm/avg.), helps alleviate stress on the assembly and provide a retention feature. According to this embodiment, the u-shaped part is preferably formed from a material having a higher temperature capability than the manifold. Thus, if the manifold is formed from a SiMo cast iron, the u-shaped part may be formed from a Ni-resist alloy for example. The divider plate should also be formed from a material having at least comparable temperature and/or thermal gradient capabilities as that of the u-shaped part.

Methods of manufacturing the various components, including the body and the u-shaped part described herein, would include, but not be limited to: a) sand casting, b) lost wax casting, c) permanent mould or die casting, d) forging forming, and e) machining from bar stock. For the case of sand casting, the channel could possibly be cast in place if the channel dimensions were robust enough (sufficiently wide groove and not too deep). The channel could be formed in its entirety using the other casting methods. In all cases the channel could also be formed by a machining operation. Note that machining the channel prior to moulding/casting is much more practical than machining the channel inside the manifold. The divider plate 18b insert would likely be a stamping, but could be made by any of the aforementioned methods.

Figure 10:
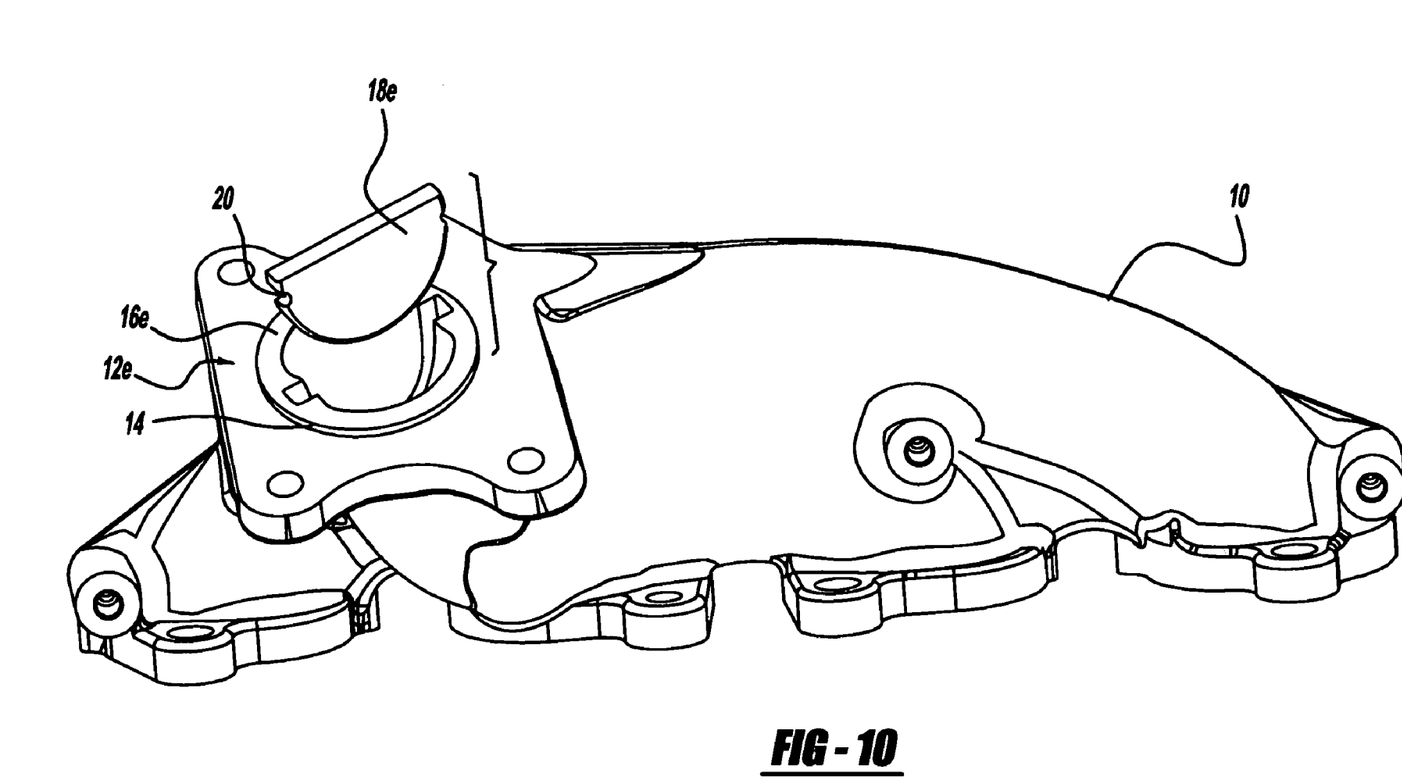
FIG. 10 is a partially blown apart perspective view of an exhaust manifold assembly employing a fourth divider plate assembly in accordance with the teachings of the present invention.

Referring to FIG. 10, yet another divider plate assembly is shown. This embodiment is similar to that of FIGS. 4-6 in that it is essentially a two piece construction, namely the body 16c and the divider plate 18b. Under this embodiment, the divider plate 18b is provided with outwardly projecting tabs along the upper portion of the peripheral edge 24 which assist in locking the insert in place in the event that the body is cast about the insert.

What is claimed is:

1. A combustion engine exhaust assembly for an automobile comprising:
    a cast metal manifold which is optionally coupled to a separate turbocharger, said manifold including multiple runners which converge to form a manifold outlet portion defining an internal exhaust gas passageway which is cast as part of said manifold and into which exhaust gas is collected, said passageway including a slot formed in the outlet portion along said exhaust gas passageway; and
    an axially disposed divider plate inserted into said slot and extending across said passageway to segregate the exhaust gas into at least two separate gas flow paths as it exits the manifold outlet portion;
    wherein said divider plate is formed from a material which differs from said manifold such that it is capable of elastic deformation during rapid heating of the exhaust manifold; and
    said divider plate is inserted into the slot formed in said outlet portion.

2. The exhaust assembly of claim 1, wherein said divider plate comprises stainless steel or ceramic.

3. The exhaust assembly of claim 1, further comprising a body portion which is formed as an integral part of said outlet portion.

4. The exhaust assembly of claim 1, wherein said divider plate includes locking tabs.

5. The exhaust assembly of claim 1, wherein said divider plate includes a reinforced peripheral edge.

6. The exhaust assembly of claim 1, further comprising a body associated with said divider plate to secure said divider plate with said slot.

7. The exhaust assembly of claim 6, wherein said body and said divider plate are formed separately.

8. The exhaust assembly of claim 6, wherein said body further comprises a u-shaped part which is inserted into said slot, said u-shaped part also including a slot for receiving and securing the leading edge of said divider plate.

9. A combustion engine exhaust assembly of an automobile comprising:
    a SiMo cast metal exhaust gas component including an integrally cast outlet portion defining an exhaust gas passageway and multiple channels leading from a combustion engine to said outlet portion whereby exhaust gas is collected by said channels into said passageway and directed through said outlet portion; and
    a divider plate assembly positioned within and extending across said manifold outlet portion to segregate said outlet portion into at least two gas flow paths;
    wherein said divider plate assembly is formed from materials which are more resistant to at least one of higher temperature conditions, higher thermal gradient conditions, and/or higher loading than said exhaust gas components; and
    where said divider plate has a substantial cylindrical shape including a bisecting wall extending the length of the cylinder.

10. The exhaust assembly of claim 9, wherein said divider plate assembly further comprises a body and a divider plate.

11. The exhaust assembly of claim 10, wherein at least one of said body and said divider plate are formed from a material selected from the group consisting of stainless steel and ceramics.

12. A combustion engine exhaust manifold assembly optionally coupled to a separate turbo charger comprising:
    a cast metal manifold component including a plurality of runners converging to an integral outlet portion to define an internal gas passageway of said cast metal manifold, said outlet portion including a slot formed into the manifold; and
    a divider plate assembly disposed within the slot of said outlet portion, said divider plate assembly including:
    a body separately formed from said manifold and disposed within said slot; and
    a divider plate insertably attached to said body, said divider plate being operable to divide said outlet portion into a first chamber and a second chamber;
    whereby said divider plate is formed from a material which is more resistant to at least one of higher temperature conditions, higher thermal gradient conditions, and/or loading than said exhaust manifold; and wherein said body is formed separately from said outlet portion.

13. The exhaust manifold assembly of claim 12, wherein said divider plate assembly is formed at least in part from stainless steel or ceramics.

14. The exhaust manifold assembly of claim 12, wherein said body is integrally formed as part of said outlet portion.

15. The exhaust manifold assembly of claim 12, wherein said divider plate is integrally cast with said body as a single component.

16. The exhaust manifold assembly of claim 12, wherein said divider plate and said body are separately formed components.

17. The exhaust manifold assembly of claim 12, wherein said insert assembly further comprises a substantially u-shaped part disposed between said body and said divider plate.

18. The exhaust manifold assembly of claim 12, wherein said divider plate includes locking tabs.

19. The exhaust assembly of claim 12, wherein said divider plate includes a reinforced peripheral edge.

* * * * *